(12) United States Patent
He et al.

(10) Patent No.: US 12,265,652 B2
(45) Date of Patent: Apr. 1, 2025

(54) DOCUMENT SIGNING AND STORAGE USING DATA MODELS AND DISTRIBUTED LEDGERS

(71) Applicant: ADOBE INC., San Jose, CA (US)

(72) Inventors: Songlin He, Chengdu (CN); Tong Sun, San Ramon, CA (US); Rajiv Jain, Falls Church, VA (US); Nedim Lipka, Campbell, CA (US); Curtis Wigington, San Jose, CA (US); Anindo Roy, Fremont, CA (US)

(73) Assignee: Adobe Inc., San Jose, CA (US)

( * ) Notice: Subject to any disclaimer, the term of this patent is extended or adjusted under 35 U.S.C. 154(b) by 226 days.

(21) Appl. No.: 18/055,673

(22) Filed: Nov. 15, 2022

(65) Prior Publication Data
US 2024/0160791 A1 May 16, 2024

(51) Int. Cl.
*G06F 21/64* (2013.01)
(52) U.S. Cl.
CPC .................. *G06F 21/64* (2013.01)
(58) Field of Classification Search
CPC ....... H04L 9/50; G06F 21/64; G06F 21/6245; G06F 21/6254; G06F 16/93; G06F 16/1805; G06F 16/2358; G06F 40/186; G06Q 50/18
See application file for complete search history.

(56) References Cited

U.S. PATENT DOCUMENTS

| | | | | |
|---|---|---|---|---|
| 9,672,524 B2* | 6/2017 | Papa | ................... | G06F 16/3331 |
| 9,992,022 B1* | 6/2018 | Chapman | .............. | H04L 9/3236 |
| 11,477,271 B2* | 10/2022 | Snow | ................... | H04L 9/0643 |
| 2004/0139327 A1* | 7/2004 | Brown | ................... | G06F 21/34 |
| | | | | 713/176 |
| 2011/0314371 A1* | 12/2011 | Peterson | .............. | G06F 40/186 |
| | | | | 715/234 |
| 2018/0219685 A1* | 8/2018 | Deery | ................... | H04L 9/3247 |
| 2018/0365201 A1* | 12/2018 | Hunn | ................... | G06F 40/143 |
| 2019/0207770 A1* | 7/2019 | Zhou | ................... | H04L 9/3239 |

(Continued)

FOREIGN PATENT DOCUMENTS

| | | | | |
|---|---|---|---|---|
| CN | 114239039 A | * | 3/2022 | |
| CN | 113361243 B | * | 9/2023 | ........... G06F 40/126 |

OTHER PUBLICATIONS

IEEE. "Standard for Blockchain-based Electronic Contracts," in IEEE Std 3801-2022 , vol. No., pp. 1-26, Apr. 1, 2022, doi: 10.1109/IEEESTD.2022.9745868. (Year: 2022).*

(Continued)

*Primary Examiner* — Michael Simitoski
(74) *Attorney, Agent, or Firm* — Shook, Hardy & Bacon L.L.P.

(57) ABSTRACT

A method includes populating a template database with templates associated with template identifiers (IDs) identifying the templates. The method also includes generating a data model that references a template within the template database, where the data model includes a template ID referencing the template in the template database, and where the template includes a parameter field. The data model further includes a template parameter to apply to the parameter field and a digital signature for at least the template ID and the template parameter. The method also includes deploying the data model within a distributed ledger.

19 Claims, 11 Drawing Sheets

(56) References Cited

U.S. PATENT DOCUMENTS

| | | | | |
|---|---|---|---|---|
| 2019/0325044 | A1* | 10/2019 | Gray | H04L 9/3239 |
| 2019/0354724 | A1* | 11/2019 | Lowagie | G06F 16/152 |
| 2020/0042985 | A1* | 2/2020 | Snow | H04L 9/3239 |
| 2020/0057994 | A1* | 2/2020 | Hunn | H04L 9/50 |
| 2020/0242196 | A1* | 7/2020 | Miyamoto | G06F 18/22 |
| 2020/0327499 | A1* | 10/2020 | Ganapathy | G06F 16/27 |
| 2021/0109919 | A1* | 4/2021 | Raj | G06F 21/64 |
| 2021/0133197 | A1* | 5/2021 | Nguyen | H04L 9/3239 |
| 2021/0327007 | A1* | 10/2021 | Han | H04L 9/50 |
| 2021/0342822 | A1* | 11/2021 | Lau | G06Q 20/401 |
| 2022/0253959 | A1* | 8/2022 | Wu | H04L 9/3247 |
| 2023/0351535 | A1* | 11/2023 | Hunn | H04L 9/0891 |

OTHER PUBLICATIONS

R. van der Meyden, "A Formal Treatment of Contract Signature," in IEEE Transactions on Services Computing, vol. 15, No. 6, pp. 3101-3114, Published Aug. 4, 2021. (Year: 2021).*

Ma W. CN-113361243-B (machine translation), Published Sep. 8, 2023. (Year: 2023).*

Wang D. CN-114239039-A (machine translation), Published Mar. 25, 2022. (Year: 2022).*

Sarang, Shikhar, et al. "Document Management System Empowered by Effective Amalgam of Blockchain and IPFS." Procedia Computer Science 215 (2022): 340-349. (Year: 2022).*

Wood, G., "Ethereum: A Secure Decentralised Generalised Transaction Ledger", Ethereum project yellow paper, EIP-150 Revision, pp. 1-32 (2014).

Goldwasser, S., et al., "A Digital Signature Scheme Secure Against Adaptive Chosen-Message Attacks", SIAM Journal on computing, Society for Industrial and Applied Mathematics, vol. 17, No. 2, pp. 281-308 (Apr. 1988).

Asokan, N., et al., "Optimistic Protocols for Fair Exchange", in Proceedings of the 4th ACM Conference on Computer and Communications Security, pp. 1-11 (1997).

Kordy, B., and Radomirovic, S., "Constructing Optimistic Multi-party Contract Signing Protocols", In IEEE 25th Computer Security Foundations Symposium, IEEE, pp. 215-229 (2012).

Wang, D., et al., "Privacy-Awareness Fair Contract Signing Protocol Based on Blockchain", in International Symposium on Cyberspace Safety and Security, Springer, pp. 274-278 (2019).

"Federal Information Processing Standards Publication", FIPS Pub 186-4, Digital Signature Standard, Retrieved from Internet URL : http://dx.doi.org/10.6028/NIST.FIPS.186-4, pp. 1-130 (Jul. 2013).

Benet, J., "IPFS—Content Addressed, Versioned, P2P File System", (Draft 3), arXiv:1407.3561v1, pp. 1-11 (Jul. 14, 2014).

Nakamoto, S., "Bitcoin: A Peer-to-Peer Electronic Cash System", Retreived from Internet URL: https://bitcoin.org/bitcoin.pdf, pp. 1-9 (2008).

Bao, F., et al., "Analysis and Improvement of Micali's Fair Contract Signing Protocol", in Australasian Conference on Information Security and Privacy, Springer, pp. 176-187 (2004).

Wan, Z., et al., "Electronic contract signing without using trusted third party", In International Conference on Network and System Security, Springer, pp. 386-394 (2015).

Zhang, L., et al., "Blockchain-Based Two-Party Fair Contract Signing Scheme", Information Sciences, vol. 535, pp. 142-155 (2020).

Maram, D., et al., "CanDID: Can-Do Decentralized Identity with Legacy Compatibility, Sybil-Resistance, and Accountability", in IEEE Symposium on Security and Privacy, pp. 1-21 (2021).

Boneh, D., et al., "Compact Multi-signatures for Smaller Blockchains", In International Conference on the Theory and Application of Cryptology and Information Security, Springer, pp. 435-464 (2018).

Ben-Or, M., et al., "A Fair Protocol For Signing Contracts", IEEE Transactions on Information Theory, vol. 36, No. 1, pp. 40-46 (Jan. 1990).

Mukhamedov, A., and Ryan, M., D., "Fair multi-party contract signing using private contract signatures", Information and Computation, vol. 206, pp. 272-290 (2008).

Huang, H., et al., "A Fair Three-Party Contract Singing Protocol Based On Blockchain", In International Symposium on Cyberspace Safety and Security, Springer, pp. 72-85 (2017).

Gupta, A., et al., "Digital signature: use and modification to achieve success in next generational e-business processes", Information & Management, vol. 41, No. 5, pp. 561-575 (2004).

Androulaki, E., et al., "Hyperledger Fabric: A Distributed Operating System for Permissioned Blockchains", in Proceedings of the thirteenth EuroSys conference, pp. 1-15 (2018).

"Accord project: The open source stack for smart legal contracts", GitHub, A Linux Foundation Project, Retrieved from Internet URL : https://github.com/accordproject, accessed on Feb. 24, 2023, pp. 3 (2021).

Ferrer-Gomila, J., L., et al., "Optimality in Asynchronous Contract Signing Protocols", In International Conference on Trust, Privacy and Security in Digital Business, Springer, pp. 200-208 (2004).

Tian, H., et al., "Contract Coin: Toward Practical Contract Signing on Blockchain", In International Conference on Information Security Practice and Experience, Springer, pp. 43-61 (2017).

* cited by examiner

AGREEMENT

Parties:
① _____ Residing at: _____
② _____ Residing at: _____

Jurisdiction: This agreement is governed by the state law of _____

Party 2: Type of entity: _____

Clause 1: Party 1, the licensor, agrees to license to Party 2, the licensee, the right to play the attached songs publicly for one day in return for $_____
Payable by _____

*FIG. 3.*

```
1  {
2    "agreement_template_id": "AGREEMENT-8ddi4d0adbc8...", ⏜502
3    "agreement_data_fields": [
4      "licenseeName": "Alice",
5      "licenseeState": "NY",                                    ⎫
6      "licenseeEntityType": "individual",                       ⎬ ⏜506
7      "licenseeAddress": "123 Main Street",
8      "licensorName": "Bob", ...],                              ⎭
9    "attachment_id": [
10     "QmeGPbyGuz3vSLegSYkz92KHfuJj6Dz5gGWnPXaSaww4J", ...],
11   "clause_instance": [{
12     "clause_id": "CLAUSE-930497c469f53d...", ⏜510             ⎫
13     "params": [                                               ⎪
14       "amount": "100",                                        ⎬ ⏜514
15       "amount_text": "one_hundred",                           ⎪
16       "payment_method": "bank_transfer" }, ...],              ⎭
17   "matadata": [
18     "agreement_creation_timestamp": "2022/03/06", ...],
19   "signature_info": [{
20     "licenseeSignature": {...},                               ⎫
21     "licenseeSignDate": "16:10:50/March 10 2022" }, {         ⎬
22     "licensorSignature": {...},                               ⎪
23     "licensorSignDate": "11:20:31/March 11 2022" } ]          ⎭
24 }
```

504 ─ lines 4–8
508 ─ lines 11–16
512 ─ line 17–18
516 ─ lines 19–21
518 ─ lines 22–23

DOCUMENT SIGNING AND STORAGE USING DATA MODELS AND DISTRIBUTED LEDGERS

BACKGROUND

The technology relates to digital document signing and storage methods. More specifically, the technology relates to signing and storing documents using a data model representative of a document. Documents have historically been signed by hand. Digital signatures are sometimes used because they can be more verifiable than hand signatures. Conventionally, documents are exchanged over a network, and digital signatures are applied to the documents. A digital signature indicates that a document has been signed. Signed documents are then stored in a database and can be recalled to verify the document signatures.

SUMMARY

At a high level, aspects described herein relate to document signing using a data model that can be stored within a distributed ledger.

To do so, document templates are populated into a template database. The template database is a distributed ledger (e.g., a blockchain) and stores the templates in an immutable manner. The templates are associated with template identifiers (IDs) that identify templates within the template database.

The templates include parameter fields, which are aspects of the templates to which template parameters can be applied. For example, the parameter field may be a fillable aspect of the template where a value or other condition (the template parameter) might be entered and associated thereto. In some aspects, a portion of the template may be identified as a clause, which identifies a performance element of the agreement and may be deployed as a smart contract. Individual clauses of templates can be identified by a clause ID.

When creating an agreement for signing, a data model can be generated with a template ID that identifies a particular template in the template database. The data model can be generated to further include a template parameter associated with a parameter field of the template identified by the template ID. Where the parameter field is part of a clause, the clause ID is further provided in the data model and associated with the template parameter applied to the parameter field.

In doing this, the data model represents the agreement. The data model is communicated to a signor and is digitally signed. The digital signature is included as part of the data model and the data model is deployed on a hybrid architecture composing of a distributed ledger (e.g., a blockchain) and a distributed storage network (DSN) as an immutable representation of the agreement.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 3 illustrates an example template, in accordance with an aspect described herein;

FIG. 5 illustrates an example data model, in accordance with an aspect described herein;

DETAILED DESCRIPTION

Figure 1:
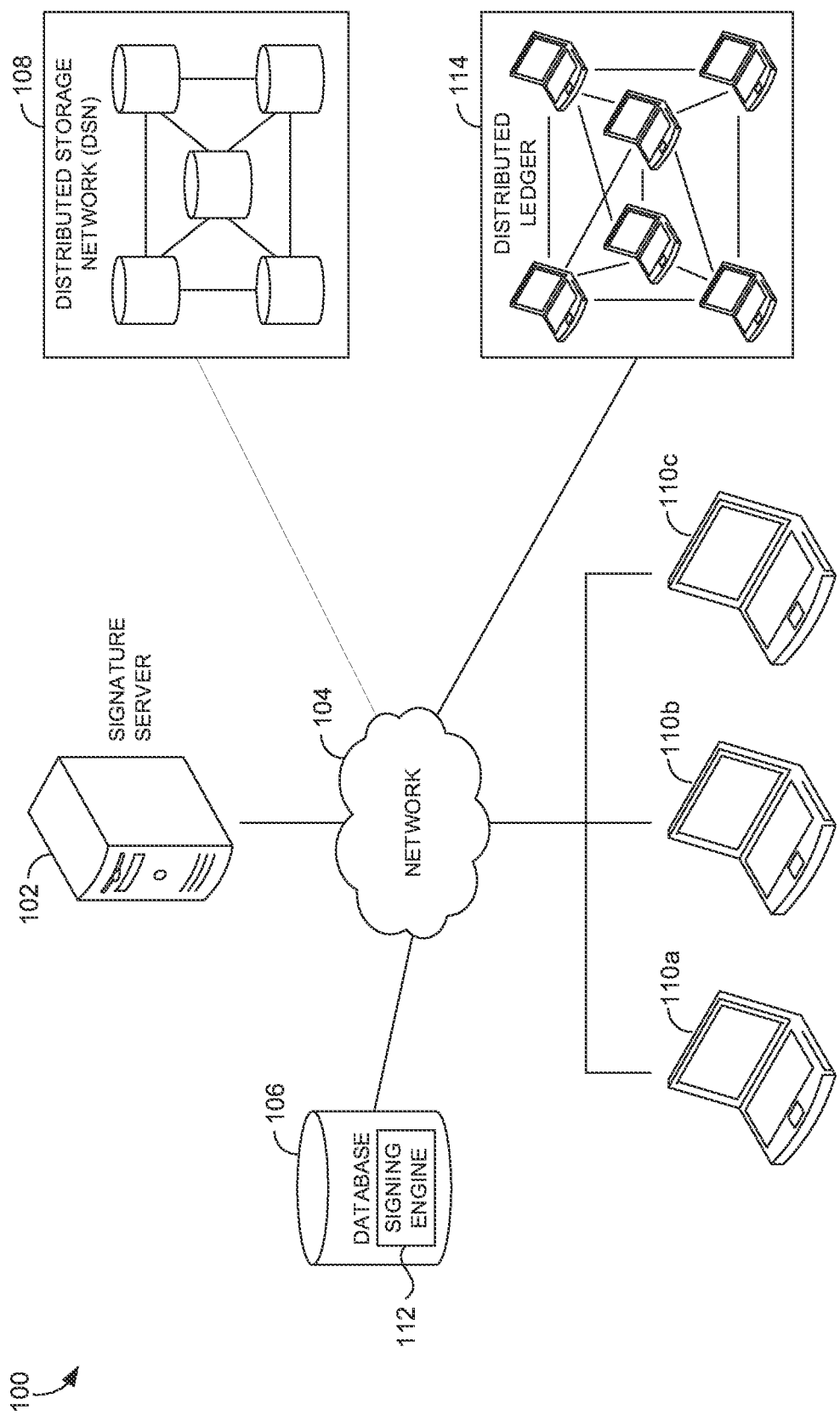
FIG. 1 illustrates an example operating environment suitable for implementing aspects of the technology, in accordance with an aspect described herein.

Agreement signing can be computationally expensive. In general, the size of the agreement being signed creates several issues when trying to sign and store the agreement. First, when signing an agreement, it is generally transmitted between various signors through a signing service. The size of the agreement directly relates to whether or not the agreement can be reasonably communicated between computing devices. Some agreements have large file size requirements, especially those with large attachments, or other elements, such as audio, image, or video features. These all increase the size of the agreement being signed and make transmission challenging. This problem is compounded when signors attempt to view and sign an agreement on smaller devices, such as tablets, phone, and smartwatches, which have more limited processing power and storage space. Moreover, when there are multiple signors, often the signed agreement is passed from one signor to another to add further digital signatures. When this occurs, the file size increases with each pass, since the metadata of the file now includes the digital signatures of the other signors.

The large file size of some agreements not only makes it challenging to communicate and review an agreement, but it also makes it challenging to implement digital signature algorithms. Many digital signature systems use hashing algorithms that hash the agreement. These algorithms demand more processing power as the size of the agreement increases, as there is more data to pass through the hashing algorithm. In turn, this could lead to a slow digital signature process, and this may further restrict some smaller devices from being able to digitally sign an agreement.

Another problem that arises with agreements stored in an electronic format, such as those that serve as the basis of smart contracts, is the amount of storage space required when the agreement is large. As noted, agreement file sizes increase dramatically when the subject of the agreement has audio, image, or video elements, which are commonly included in electronic agreements, unlike traditional paper-based agreements. Thus, it becomes challenging to hash some of these files when digitally signing an agreement.

To solve these problems, the present technology provides for methods of generating data models that are representative of an agreement, and from which, the agreement may be produced. The data model may be in the form of a JSON (JavaScript Object Notation) file, which provides a file format that is significantly smaller in size relative to the agreement it represents. By generating a data model comprising data objects representative of the agreement, or at least a portion of the agreement, the agreement can be reproduced using the data objects to identify portions of the agreement stored in an immutable manner in a distributed ledger and a DSN based hybrid architecture. Further, when in a JSON format, the data model can be easily communicated and reviewed by relatively smaller devices, thus enabling signature services to be performed using a variety of devices, such as smartphones, smartwatches, and the like.

In part, signature services can be performed using less processing power and smaller devices because the digital signature algorithm, such as a hashing algorithm, determines a digital signature (e.g., a hash value) from the data model, as opposed to determining the digital signature from the agreement, itself. This is particularly beneficial when there are large agreements or attachments, such as those including images or video, as the digital signature algorithm generates the digital signature from the data model, as opposed to generating the digital signature using the actual image or video. Thus, smaller devices and processors can be used to digitally sign agreements.

The technology further enhances storage options for signed agreements. As noted, many agreements, especially digital agreements containing audio, images, and video, have large storage requirements. In many cases, these large data sizes make it prohibitive to directly store signed agreements using distributed ledgers, which possess many desired security benefits for agreement storage while usually require a full copy of an agreement among each node in the distributed ledger network. Instead, by representing the signed agreement using the data model, only the necessary data references for agreements are deployed on a distributed ledger and just one copy of the large size-data, e.g., attachments, may be stored on a DSN, overall yielding much less storage costs. The data model essentially indicates the signed agreement, and it can be used to retrieve or construct the signed agreement.

One way to achieve these signing and storage benefits starts by populating a template database. The template database is populated with templates that can be used as the basis for forming a signed agreement. In general, a template may comprise all or a portion of a document. Each template can include a fixed element, such as textual or other visual elements that are unchanging, and one or more parameter fields that are Tillable aspects of the template to which template parameters can be applied. Templates may also have one or more clauses, which identify a performance element of the agreement and may be deployed as a smart contract. For instance, a clause may be a self-executable portion of an agreement, e.g., a portion of an agreement indicating an action taken in response to the performance of some action. A clause of the template may comprise fixed elements and one or more parameter fields.

The template database can be populated by storing the templates within the template database and associating the template with a template ID. The template ID comprises a string that identifies the template within the template database. The template database may be a distributed ledger (e.g., a blockchain) that stores the templates in an immutable manner. In this way, there is a high confidence that the template ID identifies a template that does not change, providing confidence that the final agreement is also immutable. Individual clauses that form all or portions of templates may also be stored in the distributed ledger and may be used to form all or a portion of an agreement template. Clauses may also be stored in an immutable manner and associated with a clause ID that identifies the clause.

Having populated the template database, a data model can be generated. The data model generally represents an agreement. The data model comprises one or more template IDs identifying a template or one or more clause IDs identifying clauses. The data model further comprises one or more template parameters that are to be applied to the parameter fields of the templates or clauses respectively associated with the template IDs or clause IDs. In some cases, an agreement may have an attachment, such as an audio, video, or document file, that is also stored in an immutable manner, e.g., the template database. In such cases, the data model may further comprise one or more attachment IDs that identify the stored attachments.

The data model can be generated in a JSON file format. The JSON file format provides a standard format to represent the agreement. That is, the template ID, clause ID, attachment ID, and any template parameters can be structured in the JSON file format, and thus, the JSON file represents the agreement and can be used to reconstruct the agreement. In this way, the data model, now representing the agreement, can be communicated for signing. The signor and any other party have confidence that digitally signing the data model is, in effect, providing a digital signature to the agreement, as the elements of the agreement are stored immutably, and the template parameters within the data model can be applied to the parameter fields of the template, thereby constructing the agreement.

A signature service may be used to digitally sign the communicated data model. As noted, the data model may be quickly uploaded and downloaded by various devices of a network, since the file size is relatively low compared to the agreement itself. As noted, this allows smaller devices to review and execute the data model as the agreement. This further allows devices connected to relatively low speed networks to engage in the signing process.

When digitally signing the data model, the signing algorithm of the signature service generates a value using the data model. For instance, a hashing algorithm hashes the data model to generate the digital signature. The hashing of the data model is significantly less computationally involved compared to hashing the entire agreement, again, allowing devices with minimal processing power to be used to digitally sign the data model as the agreement.

Once digitally signed, the digital signature can be included in the JSON file format with the other agreement elements, thus indicating the agreement represented by the data model has been executed. The data model can be stored so that the data model can be recalled and used to construct the agreement. Since the data model is smaller in file size and may comprise a standard format, such as JSON file format, the data model can be deployed onto many types of distributed ledgers for storage. In many cases, the data model can be deployed within a distributed ledger that would otherwise not be available for storing the agreement due to the file size, and the computational requirements to store and recall files on the distributed ledger. This ultimately provides enhanced security, visibility, and trust for the agreement. In addition to, or in lieu of, deploying the data model within a distributed ledger, clauses of the executed agreement can be deployed on a distributed ledger for execution as a smart contract. Thus, instead of deploying the entire clause, which may be lengthy and reference or include attachments, a data model having the clause ID and any template parameters can be deployed as the smart contract, thereby decreasing the computational requirements for nodes storing and modifying the distributed ledger to facilitate performance of the smart contract.

It will be realized that the methods previously described are only some examples that can be practiced from the description that follows, and it is provided to more easily understand the technology and recognize its benefits. Additional examples are now described with reference to the figures.

FIG. 1 illustrates an example operating environment 100 in which aspects of the technology may be employed. Operating environment 100 comprises signature server 102, which communicates via network 104 to other components of operating environment 100, including database 106, DSN 108, and client devices 110a-110c.

In general, signature server 102 is a computing device that executes aspects of signing engine 112. Like other components, signature server 102 is intended to represent one or more servers. Signing engine 112 is employed by signature server 102 to facilitate aspects of generating, singing, and deploying an agreement as a data model, which will be further discussed. As noted, signature server 102 may be a computing device that performs aspects of signing engine 112. One example computing device that is suitable is computing device 800, which is further discussed with reference to FIG. 11.

Components of operating environment 100 communicate using network 104. Network 104 may include one or more networks (e.g., public network or virtual private network "VPN") as shown with network 104. Network 104 may include, without limitation, one or more local area networks (LANs), wide area networks (WANs), or utilize any other wired or wireless communication network or method.

Database 106 generally stores information including data, computer instructions (e.g., software program instructions, routines, or services), or models used in embodiments of the described technologies. Although depicted as a single database component, database 106 may be embodied as one or more data stores or may be in the cloud. Database 106 can comprise machine-readable instructions corresponding to signing engine 112, which are executable by signature server 102 or other components of operating environment 100.

Components of signature server 102 may further communicate with DSN 108. In general, DSN 108 may comprise any type of distributed storage system having a plurality of datastores that facilitate storing and communicating information. The plurality nodes may comprise a peer-to-peer storage network system. In a particular aspect, DSN 108 is the IPFS (InterPlanetary File System). DSN 108 may comprise a public or private network. In a specific case, DSN 108 is a public network that allows public contribution and retrieval of data stored within DSN 108.

Components of FIG. 1 may also communicate with one or more nodes of distributed ledger 114, e.g., a distributed ledger network. In an aspect, distributed ledger 114 comprises a blockchain that facilitates digital information storage and transfer using digital currency. As an example, blockchain platforms such as Hyperledger Fabric, Ehereum, and the like, can be used as distributed ledger 114. In an aspect, DSN 108 and distributed ledger 114 together form a hybrid storage network for storing information, such as templates, attachments, etc., along with their corresponding IDs, as will be described.

Client devices 110a-110c illustrates one or more client computing devices communicating with components of operating environment 100 via network 104. Any number of client devices may be included in the one or more client devices illustrated by client devices 110a-110c. Each of client devices 110a-110c may comprise a computing device, an example of which is provided as computing device 1100 and is discussed with reference to FIG. 11.

In general, and as will be further discussed, any one or more of client devices 110a-110c can be used to generate and sign an agreement. For instance, a client device may be used to generate an agreement in the form of a data model, digitally execute the data model using signing engine 112, and deploy the signed data model onto distributed ledger 114.

Having identified various components of operating environment 100, it is emphasized that additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Figure 2:
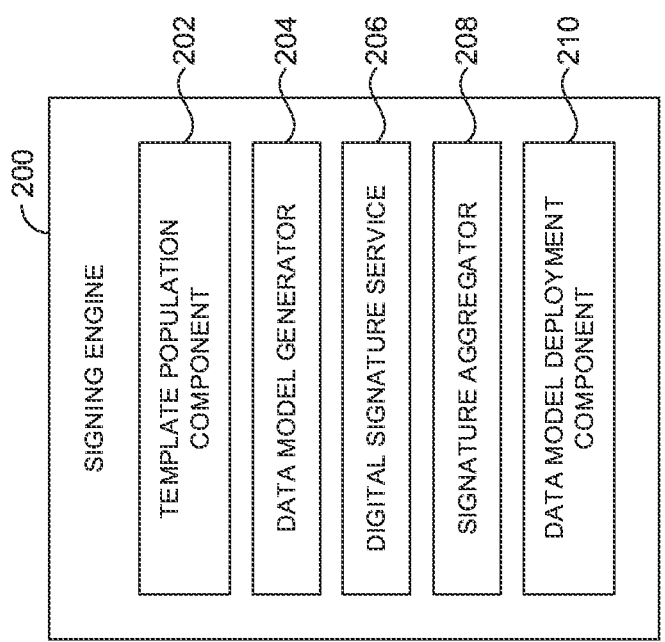
FIG. 2 illustrates an example signing engine, in accordance with an aspect described herein.

Turning now to FIG. 2, an example signing engine 200 is provided. In general, signing engine 200 facilitates generating an agreement as a data model, digitally signing the agreement as represented by the data model, and deploying (e.g., storing) the data model in a distributed ledger in combination with a DSN. Signing engine 200 is one example that may be employed as signing engine 112 of FIG. 1. As illustrated, signing engine 200 comprises template population component 202, data model generator 204, digital signature service 206, signature aggregator 208, and data model deployment component 210.

It is noted that some elements of FIG. 2 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory. Moreover, functions of signing engine 200 may be performed by computing devices, such as signature server 102, client devices 110a-110c, among other computing devices not shown, and may be performed in whole or in part by the computing devices in any combination.

As previously described, an agreement can be formed at least in part from a template. Signing engine 200, using template population component 202, may populate a template database with templates, which can be accessed by a computing device to store or retrieve a template for an agreement. Template population component 202 stores templates within the template database and retrieves a template to use as a basis of an agreement. The template database may comprise a distributed ledger. In general, a template may form all of, or a portion of, an agreement, and the final agreement may be formed from one or more templates.

As an example, a template may comprise any number or combination of fixed elements, parameter fields, and clauses. Fixed elements may include textual or other visual elements that are unchanging, i.e., they are fixed within the template. When stored in the template database, the template is immutable, meaning that the fixed element of the template is an unchanging portion of the template.

As an example illustration, template 300 is provided as FIG. 3. Template 300 forms at least a portion of an agreement. In this example, some fixed elements are illustrated as fixed element 302a and fixed element 302b. Here, fixed element 302a and fixed element 302b are each textual elements, but as noted, fixed elements are not limited to textual elements and may be any unchanging element of a template.

Templates may also comprise parameter fields. Parameter fields are Tillable aspects of a template. For instance, parameter fields can be portions of a template that are indicated as input points. Thus, the parameter fields are locations to which inputs can be associated. Inputs associated with parameter fields are generally described as template parameters. As such, a template comprises a parameter field that can be associated with a template parameter. As an example, a template could read, "[_____] agrees to pay [_____] the sum of . . . ." Here, the fixed element comprises "agrees to pay" and "the sum of," while the parameter fields are illustrated as "[_____]," which provide input points for template parameters. For example, template parameters could be input as "'Patrick' agrees to pay 'Sullivan' the sum of . . . ," thus respectively associating the template parameters "Patrick" and "Sullivan" with the two parameter fields.

FIG. 3 further illustrates parameter fields within a template. In FIG. 3, template 300 comprises parameter fields 304a-304d. Each of parameter fields 304a-304d may be associated with a template parameter entered at a computing device, as will be further described.

Templates may also comprise one or more clauses. A clause may be a portion of the template that identifies a performance element, e.g., an element indicating an action in response to an event. A clause may be a self-executable portion of the agreement and form all of or a portion of template and agreement. Clauses may be configured so that they are deployable as a smart contract. That is, a clause may be represented by a set of computer instructions to identify an event and perform some action in response. An example may be "Alice agrees to pay Bob $100 in exchange for NFT No. 215." Clauses in templates may comprise any number of fixed elements and parameter fields. As such, template parameters may be associated with the parameter fields of the clause to form the basis of the clause, and in some cases, the smart contract.

Turning back to FIG. 3, template 300 illustrates an example clause 306. Here, clause 306 is formed from fixed element 302b and parameter field 304b. Template parameters can be associated with parameter field 304b. The clause may individually be deployed to a distributed ledger or may be included as part of the template deployed to the distributed ledger, as will be further described.

Upon generating a template comprising any number of fixed elements, parameter fields, clauses, and so forth, a template database can be populated by template population component 202 (FIG. 2) by storing the generated template within the template database, which may be a distributed ledger network, such as distributed ledger 114 of FIG. 1.

Figure 4:
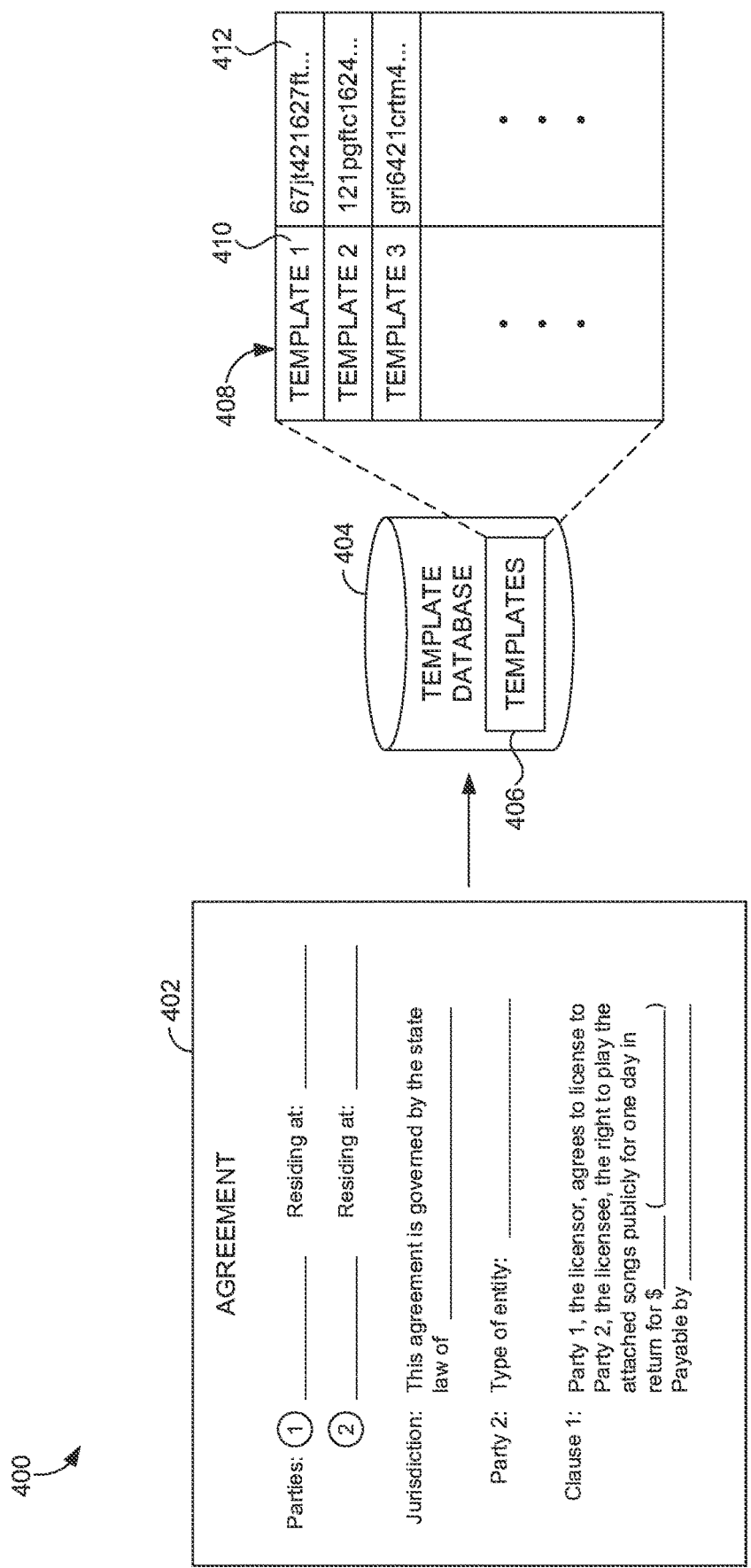
FIG. 4 illustrates the population of a template database with a template, in accordance with an aspect described herein.

FIG. 4 illustrates an example process 400 of template population component 202 populating a template database 404. Here, template 402 is a generated template. Template 300 of FIG. 3 is an example that is suitable for use as template 402 of FIG. 4. As illustrated, template 402 is being stored in template database 404, which may be illustrative of a distributed ledger network. In an aspect, templates are stored on a DSN, and a reference template ID corresponding to the stored templates is stored on a distributed ledger network, such as any of those distributed ledgers described herein.

In general, template database 404 stores stored templates 406 that may be accessed by a computing device for generating an agreement. Template database 404 may be any data storage device or system used for storing data, including stored templates 406. Template database 404 may correspond to one or more datastores, such as those described with reference to database 106 in FIG. 1. In a particular aspect, template database 404 is a distributed ledger (e.g., a blockchain) and comprises a distributed storage system for storing stored templates 406. The distributed ledger may store stored templates 406 in an immutable manner, meaning that stored templates 406 are unchangeable. In some cases, any changes made are stored within template database 404 as a new template and can be used for generating an agreement. In an aspect, blockchain platforms such as Hyperledger Fabric or Eherum in combination with IPFS can be used to store stored templates 406. In aspects, template database 604 is a permissioned consortium blockchain (e.g, everyone can see, but only authorized parties can add/update the templates). In storing a template in an immutable manner, an agreement can be formed using the template, thus providing a level of confidence that the ultimate executed agreement does not change.

The template may be encrypted when stored in template database 404. Forms of symmetric or asymmetric encryption methods may be used, and such encryption methods will be generally understood by those skilled in the art. Doing so provides security for the agreement when stored in a distributed system.

When storing templates in template database 404, template population component 202 may generate or update template index 408. Template index 408 associates stored templates 406 with template IDs. For instance, template 410 is associated with template ID 412. In general, a template ID is a unique string that identifies a template within database 404. A hash value generated by a hashing algorithm is an example of a cryptographically secure string that may be used as a template ID. In another case, a 46-character string, or other predetermined number, is suitable. Stored templates 406 may be indexed within template index 408, such that each template is associated with a template ID. As such, the template ID may be used to identify and recall a template from template database 404.

In an aspect, clauses may also be given clause IDs. For instance, a clause of a template may be hashed to provide a hash value to use as the clause ID. In another embodiment, a 46-character string, or other predetermined number, is used as the clause ID. Clauses may be stored individually or in association with templates, such that the clauses are retrievable using the clause ID. Clauses may be stored in an immutable manner so that a stored clause remains unchanged. Clauses may be stored in any type of datastore described herein. In a particular case, clauses are stored in a distributed ledger, e.g., a blockchain network, such as Hyperledger Fabric or Ethereum, possibly combining with a DSN, such as IPFS. Clauses may be stored in the same storage network (e.g., one blockchain platform) as template database 404 or a different storage network (e.g., from a public blockchain platform such as Ethereum and a DSN such as IPFS). One or more clauses may be selected when generating an agreement.

With general reference back to FIG. 2, data model generator 204 of signing engine 200 generates a data model. A data model may comprise one or more elements of data that are arranged in a particular manner. One such data model that is suitable for use with the present technology is a JSON file, which is one example standard file format that can be used to transmit data objects representing an agreement, among other data objects. The data objects of the data model may be used to represent an agreement. For instance, the data model may identify all or a portion of an agreement using data objects, and the data objects may be used to identify, retrieve, and construct the agreement.

To do so, data model generator 204 can generate a data model that comprises one or more template IDs or one or more clause IDs, that form part of the template, or any combination thereof. Thus, the data model can communicate and identify, to a recipient device, a template ID that can be used to identify and retrieve a template and its respective clauses from the distributed ledger, and thus, can be used to represent and reconstruct an agreement or aspects thereof.

The data model may also comprise template parameters. The template parameters included within the data model are associated with parameter fields of the template identified by the template ID in the data model. Thus, as an example, an agreement may be represented by a data model when it includes a template ID (or clause ID) and the template parameters to be applied to the parameter fields of the template. In this way, the agreement can be constructed by retrieving the template using the template ID in the data model and applying the template parameters to the parameter fields in the template. As such, the agreement is represented by the data model and can be reconstructed from the data model. However, the data model file requires significantly less storage space, which allows it to be communicated to devices on low-speed networks and signed on smaller devices with limited processing power to employ hashing algorithms.

As noted, some agreements comprise large files, such as attachments, video, images, audio, and so forth. These can be stored and also represented using an ID. For instance, an attachment, an image file, a video file, an audio file, or the like, may be stored in a DSN and given a unique ID for identifying the stored file. In an aspect, any such files may be stored in an immutable format within the DSN. The unique IDs (such as an attachment ID) may be stored on a distributed ledger network, such as any of those described herein. In aspect, the unique IDS is a hash value of the attachment, which can be used to ensure consistency and immutability of the corresponding data (such as the attachment) stored on the DSN. The files may be encrypted within the DSN to limit access to the files and to ensure confidence that the file referenced by the ID has not be changed. In cases, where an agreement includes, incorporates, or references these files, the associated ID can be included in the data model so that the agreement with the identified files may be reconstructed. As described, these types of files can be very large and require a large amount of storage space. By representing these files using their associated IDs in the data model, the data model requires less storage space, can be communicated more easily and to a larger number of devices, can be digitally signed with less processing requirements, and can be deployed within a distributed ledger network, such as distributed ledger 114 with reduced. In general, most IDs can be represented as character strings, one example being a 46-character string, or other predetermined number. Further, since the files used to reconstruct the agreement are stored immutably or under encryption, then there is a high degree of confidence that the agreement represented by the data model is unchanging.

FIG. 5 provides an example data model 500 representing an agreement. In this example, data model 500 is in a JSON file format and can be communicated and received by another computing device. Data model generator 204 of FIG. 2 can be used to generate data model 500.

Data model 500 comprises template ID 502. Template ID 502 comprises a character string that identifies a template stored in a template database. Data model 500 further comprises parameter fields 504. Parameter fields 504 indicate parts of the template associated with template ID 502. Template parameters 506 are inputs that are each respectively associated with parameter fields 504. Thus, template parameters 506 can be used as the inputs to parameter fields 504 when constructing the agreement represented by data model 500.

The particular example provided by data model 500 further comprises attachment ID 508. Attachment ID 508 is a character string that identifies an attachment stored in a database. As with other elements of the agreement, the attachment may be stored in an encrypted manner using a DSN.

Data model 500 is also illustrated having clause ID 510. Clause ID 510 is a character string identifying a clause, which may be included in the template associated with template ID 502 or may be separately stored and included as part of the agreement in addition to the template. As noted, clauses may comprise parameter fields with which template parameters can be associated. In this case, the clause associated with clause ID 510 comprises parameter fields 512. Data model 500 illustrates template parameters 514 as respectively associated with parameter fields 512. Thus, the clause can be reconstructed using data model 500.

Data model 500 may comprise additional information about the template, attachment, clause, or other aspects of the agreement. This may be included as metadata, an example of which is illustrated as metadata 516. In this case, metadata 516 is a timestamp indicating the time at which the data model, e.g, the representation of the agreement, was created.

Data model 500 may further comprise signature data 518. As will be further discussed, the agreement, as represented by data model 500 may be digitally executed. The digital signatures from the executed agreement may comprise a digital signature value, such as a hash value, and other metadata information associated with the digital signature. In this way, the signed agreement, as represented by data model 500, may be communicated in the data model format. Here, data model 500 is represented as a JSON file, and as such, the JSON file may be communicated or stored, such as being deployed to a distributed ledger and stored in a DSN.

With reference back to FIG. 2, digital signature service 206 generally facilitates signing of a data model. As noted, the data model generally represents an agreement and can be signed to show execution of the agreement or agreement with the parameter values.

Digital signature service 206 may employ any number of signing algorithms to facilitate digitally signing an agreement. For instance, a user may establish their identity through digital signature service 206 in a manner sufficient to identify the user executing the agreement via digital signature service 206. In an example, a user profile password, multifactor authentication method, IP address, or other like method may be used to identify the user. Upon identifying the user, digital signature service 206 may permit the user to review the data model, or the constructed agreement represented by the data model, and execute a digital signature.

In some cases, digital signatures apply a signing algorithm to the item being signed. Some example digital signature algorithms include RSA (Rivest-Shamir-Adleman), DSA (Digital Signature Algorithm), ECDSA (Elliptic Curve Digital Signature Algorithm), EdDSA (Edwards-curve Digital Signature Algorithm), NTRUSign, and the like. Another example is provided within the Digital Signature Standard (DSS), Federal Information Processing Standards Publication, Computer Security, Cryptography, Issued July 2013, Information Technology Laboratory National Institute of Standards and Technology, available at http://dx.doi.org/10.6028/NIST.FIPS.186-4, which is hereby incorporated by reference in its entirety.

When the agreement is digitally executed at a computing device, digital signature service 206 may apply a digital signature algorithm. In doing so, the digital signature algorithm generates the digital signature, from the data model. In some cases, the digital signature may be generated from the data model in lieu of generating the digital signature from the actual agreement represented by the data model. In some cases, the data model comprises a template ID, associated with a template that comprises parameter fields, and template parameters associated with the parameter fields, which together form the agreement. This data model can be digitally signed, and the digital signature, comprising a digital signature value, can be added back to the data model so that the data model comprises the data objects that represent the agreement, along with the digital signatures indicating digital execution of the agreement.

In general, the processing requirements to determine the digital signature from the data model are significantly less than those required to calculate a digital signature from the entire agreement, as it has more data to process through the digital signature algorithm. Again, this makes it easier to execute the agreement in the form of the data model, thereby allowing smaller devices to sign the agreement and to use devices with slow network connectivity. Further, since the data model represents the agreement in an immutable format, there is high level of confidence that the executed data model reflects the actual executed agreement, since the data model comprise IDs to identify the immutable aspects of the agreement and template parameters that are associated with any parameter fields. As the signed data model has a smaller file size, it can be more easily communicated and stored, and in particular, stored on a distributed ledger.

In some aspects of the technology, signing engine 200 of FIG. 2 employs signature aggregator 208. In some implementations, there may be multiple signors to an agreement. In such cases, digital signature service 206 may facilitate generating a digital signature for each of the signors. To reduce the file size of the data model when there are multiple digital signatures, signing engine 200 can employ signature aggregator 208 to aggregate the plurality of signatures into a single value. The aggregated signature can be added to the data model. Further reducing the size of the data model allows even more efficient signing and storage, particularly when deployed on a distributed ledger. An example algorithm and method for aggregating signatures to generate an aggregated signature is described in D. Boneh, M. Drijvers, and G. Neven, "Compact multi-signatures for smaller blockchains," in International Conference on the Theory and Application of Cryptology and Information Security. Springer, 2018, pp. 435-464, which is hereby incorporated by reference in its entirety.

Continuing with reference to FIG. 2, signing engine 200 further comprises data model deployment component 210. In general, data model deployment component 210 deploys the data model within a distributed leger. In some cases, the data model may be further saved to a DSN. The deployed data model has been generated by data model generator 204 and signed by digital signature service 206, and may include the digital signatures when deployed.

As noted, a distributed ledger may comprise multiple nodes that store information. In some cases, by deploying the data model, data model deployment component 210 communicates the data model to one or more nodes of the distributed ledger and causes the data model to be added as a record to the distributed ledger, which is maintained and updated by the nodes. In implementations, clauses of the data model are added as an executable smart contract to the distributed ledger.

Figure 6:
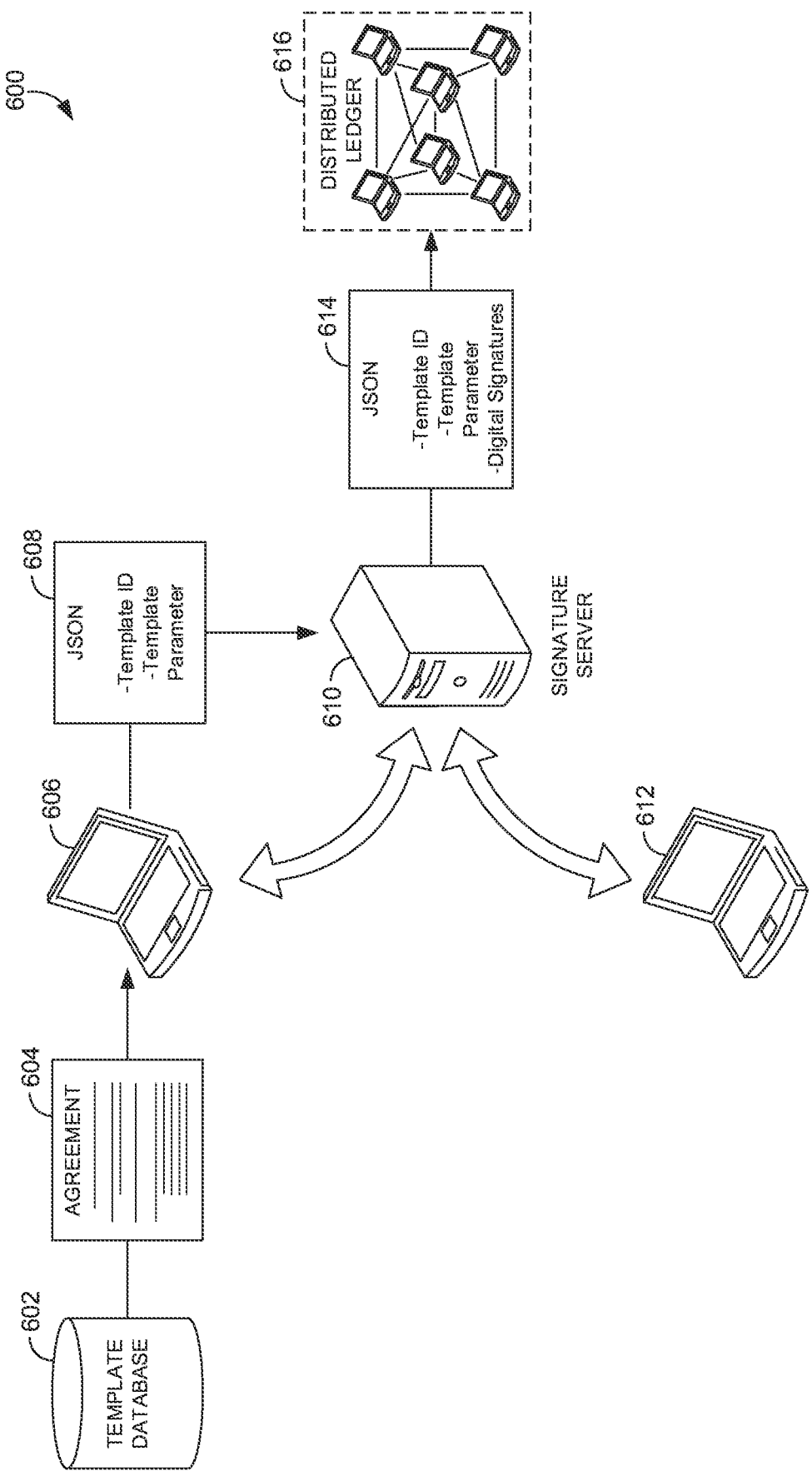
FIG. 6 illustrates an example process of digitally signing and deploying a data model, in accordance with an aspect described herein.

Using signing engine 200, a data model that represents an agreement can be generated and deployed within a distributed ledger. FIG. 6 provides an example process 600 to illustrate how signing engine 200 generates and deploys a data model.

In process 600, template database 602 is a database that stores one or more templates, such as template 604. While template database 602 is illustrated as a single datastore, it may be multiple datastores. In an aspect, template database 602 is a distributed ledger. As noted, the distributed leger network represented by 602 may be different from, or the same as, other distributed leger networks of FIG. 6, such as distributed ledger 616. Each of the items stored within template database 602 may be stored in an immutable or encrypted manner.

First client device 606 is a computing device having access to template database 602 from which it retrieves template 604 as part of forming an agreement. In an aspect, template database 602, using template population component 202 of signing engine 200, generates template 604 and stores template 604 within template database 602. Template 604 may be stored within template database 602 in an immutable or encrypted manner. Template 604 may be formed of, in whole or in part, a clause that is a self-executable element indicating an action to be performed by a computing device in response to identifying an event.

First client device 606 communicates with signature server 610 to facilitate generating an agreement and digitally executing the agreement. The agreement may be represented by data model 608. Here, data model 608 comprises a template ID and a template parameter. The template ID is associated with and identifies template 604. Template 604 comprises a parameter field. The parameter field is a portion of template 604 for which first client device 606 receives an input, and the input is provided as the template parameter and associated with the parameter field within data model 608. Although data model 608 may be structured in various data formats, here it is illustrated as structuring the data objects, such as the template ID and the template parameter, in a JSON file format. Other data objects may be included as well, some of which could include attachment IDs, clause IDs, metadata, and so forth. First client device 606 may use data model generator 204 of signing engine 200 to facilitate generating data model 608.

In the example illustrated by process 600, data model 608 is communicated to second client device 612 via signature server 610. It will be understood that this is one example, and other arrangements and processes using the aforementioned embodiments will also be suitable. Second client device 612 may receive and display the data model at the computing device. In an aspect, second client device 612 uses the IDs, such as the template ID, in data model 608 to retrieve the associated template or other data elements stored in template database 602 or other databases. When stored cryptographically, second client device 612 may use a private key or other cryptographic decipher to retrieve the template or other element of the agreement, decrypt it, and provide it via an output component of second client device 612.

Second client device 612 may employ digital signature service 206 of signing engine 200 to facilitate signing the agreement represented by data model 608. That is, digital signature service 206 may comprise a digital signature algorithm through which data model 608 is passed to generate a digital signature subsequent to verifying the signor, e.g., through a user account, multi-factor authentication method, IP address, and so forth. In some cases, second client device 612 represents multiple client devices and there are multiple signatures executed for data model 608. In such cases, signature aggregator 208 can be used in coordination with digital signature service 206 to aggregate signatures into an aggregated digital signature.

The digital signature or the aggregated digital signature may be added to the data model. Thus, when communicated, the data model represents the agreement, and from the data object, the agreement can be constructed, while also indicating that the agreement has been signed. The immutable or encrypted nature of the templates, clauses, etc. represented by the IDs in the data model, provides confidence that the underlying stored elements of the agreement are unchanging. As such, the data model can be deployed onto a distributed ledger. In some cases, the data model is also stored in a DSN. As illustrated in FIG. 6, signed data model 614 comprises the template ID identifying the immutably stored template, the template parameter that is associated with a parameter field within the template, and the digital signature (e.g., an aggregated digital signature) indicating that the agreement has been executed.

Signature server 610 uses data model deployment component 210 to deploy signed data model 614 within distributed ledger 616. In some aspects, signed data model 614 is cryptographically stored to a DSN.

Figure 7:
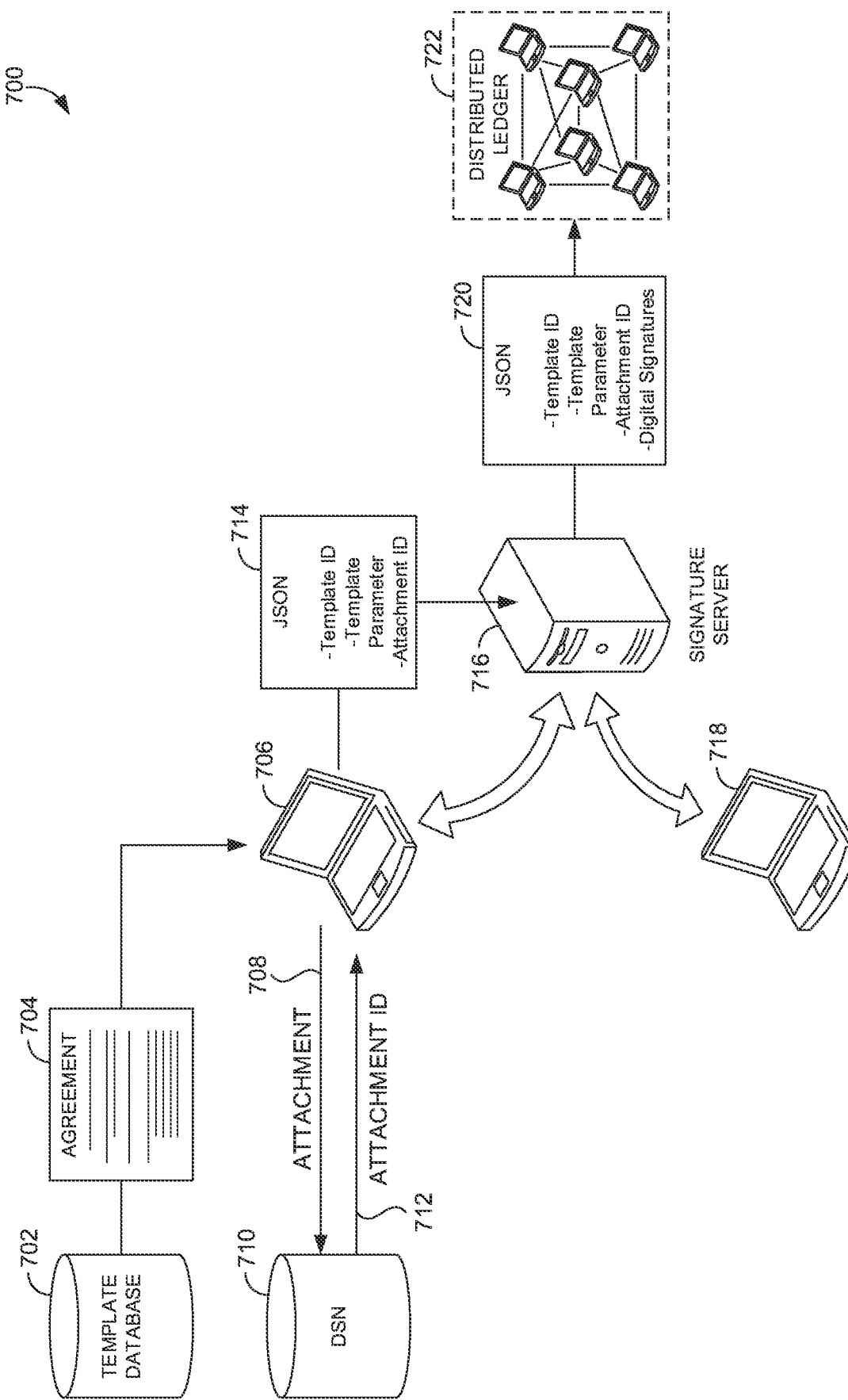
FIG. 7 illustrates another example process of digitally signing and deploying a data model, in accordance with an aspect described herein.

As noted, some implementations of the technology form an agreement having a large attachment, such as a video file, audio file, image file, and the like. FIG. 7 is provided to illustrate one example process 700 that can be performed to generate and deploy a data model with an agreement having an attachment. As with other embodiments and processes described herein, it will be understood that this is just one example, and that other arrangements and processes may be used and performed by the aforementioned technology.

In process 700, template database 702 is a database that stores one or more templates, such as template 704. While template database 702 is illustrated as a single datastore, it may be multiple datastores. In an aspect, template database 702 is a distributed ledger. As noted, when template database 702 comprises a distributed ledger, this may a distributed leger network that is the same as, or different from, other distributed ledger networks of FIG. 7, such as distributed ledger 722. Template database 702 may further comprise, among other data elements, such as clauses, which are retrievable using an associated ID. Each of the items stored within template database 702 may be stored in an immutable manner.

First client device 706 is a computing device having access to template database 702 from which it retrieves template 704 as part of forming an agreement. In an aspect, template database 702, using template population component 202 of signing engine 200, generates template 704 and stores template 704 within template database 702. Template 704 may be stored within template database 702 in an immutable manner. Template 704 may be formed of, in whole or in part, a clause that is a self-executable element indicating an action to be performed by a computing device in response to identifying an event.

In process 700, first client device 706 communicates attachment 708 to DSN 710 for storage. Attachment 708 is stored in an encrypted manner. As noted, attachment 708 may be a relatively large file compared to the template or other elements, such as a video, image, audio file, or the like. Using the DSN in combination with the template database reduces the cost of solely using a distributed ledger, e.g., a blockchain, to store aspects of the overall agreement, as only a short reference to the attachment may be deployed to a distributed ledger network, as oppose to the entire large attachment. This ultimately allows for increases in scalability to the system, even as the number of attachments and their respective sizes incorporated into agreements increases.

First client device 706 communicates with signature server 716 to facilitate generating an agreement and digitally executing the agreement in the form of data model 714. Here, data model 714 comprises a template ID and template parameter. The template ID is associated with and identifies template 704. Template 704 comprises a parameter field. The parameter field is a portion of template 704 for which first client device 706 receives an input, and the input is provided as the template parameter and associated with the parameter field within data model 714. Although data model 714 may be structured in various data formats, here it is illustrated as structuring the data objects, such as the template ID and the template parameter in a JSON file format. In process 700, data model 714 further comprises attachment ID 712. Other data objects may be included as well, some of which could include clause IDs, metadata, and so forth. First client device 706 may use data model generator 204 of signing engine 200 to facilitate generating data model 714.

In the example illustrated by process 700, data model 714 is communicated to second client device 718 via signature server 716. In an aspect, second client device 718 may receive and display data model 714 at the computing device. Second client device 718 uses the IDs, such as the template ID and attachment ID 712 in data model 714 to retrieve the associated template, attachment 708, or other data elements stored in template database 702 or DSN 710. When stored cryptographically, second client device 718 may use one or more private keys or other cryptographic decipher to retrieve the template, attachment 708, or other element of the agreement, decrypt the information, and provide it via an output component of second client device 718.

Second client device 718 may employ digital signature service 206 of signing engine 200 to facilitate signing the agreement represented by data model 714. That is, digital signature service 206 may comprise a digital signature algorithm through which data model 714 is passed to generate a digital signature subsequent to verifying the signor, e.g., through a user account, multi-factor authentication method, IP address, and so forth. In some cases, second client device 718 represents multiple client devices, and there are multiple signatures executed for data model 714. In such cases, signature aggregator 208 can be used in coordination with digital signature service 206 to aggregate signatures into an aggregated digital signature.

The digital signature or the aggregated digital signature may be added to data model 714 to provide signed data model 720. Thus, when communicated, signed data model 720 represents the agreement, including attachment 708, and from the data objects within signed data model 720, the agreement can be constructed, while also indicating that the agreement has been signed. The immutable or encrypted nature of the templates, clauses, etc. represented by the IDs in signed data model 720, provides confidence that the underlying stored elements of the agreement are unchanging. As such, the data model can be deployed onto a distributed ledger. As illustrated in FIG. 7, signed data model 720 comprises the template ID identifying the immutably stored template, the template parameter that is associated with a parameter field within the template, attachment ID 712 identifying attachment 708 in DSN 710, and the digital signature (e.g., an aggregated digital signature) indicating that the agreement has been executed and guaranteeing the integrity of the signed agreement. Signature server 716 uses data model deployment component 210 of signing engine 200 to deploy signed data model 720 within distributed ledger 722, e.g., communicating signed data model 720 to at least one node of distributed ledger 722. In some aspects, signed data model 720 is also cryptographically stored to the DSN.

Figure 8:
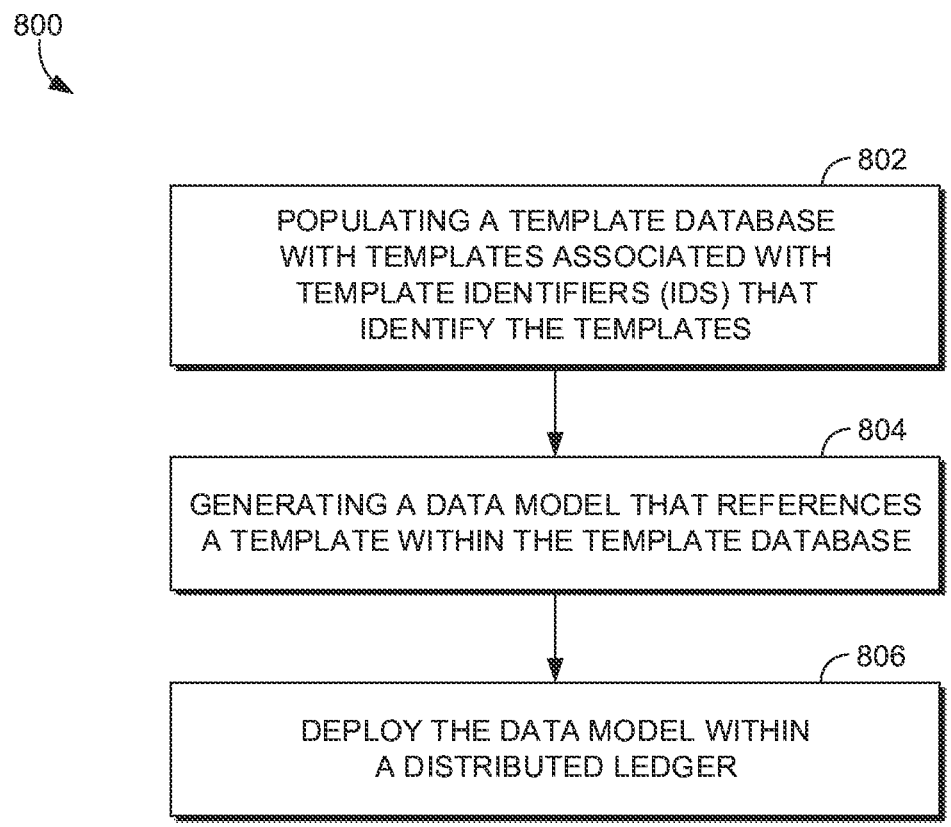
FIGS. 8-10 are block diagrams that illustrate example methods for generating and deploying data models within distributed ledgers.
Figure 9:
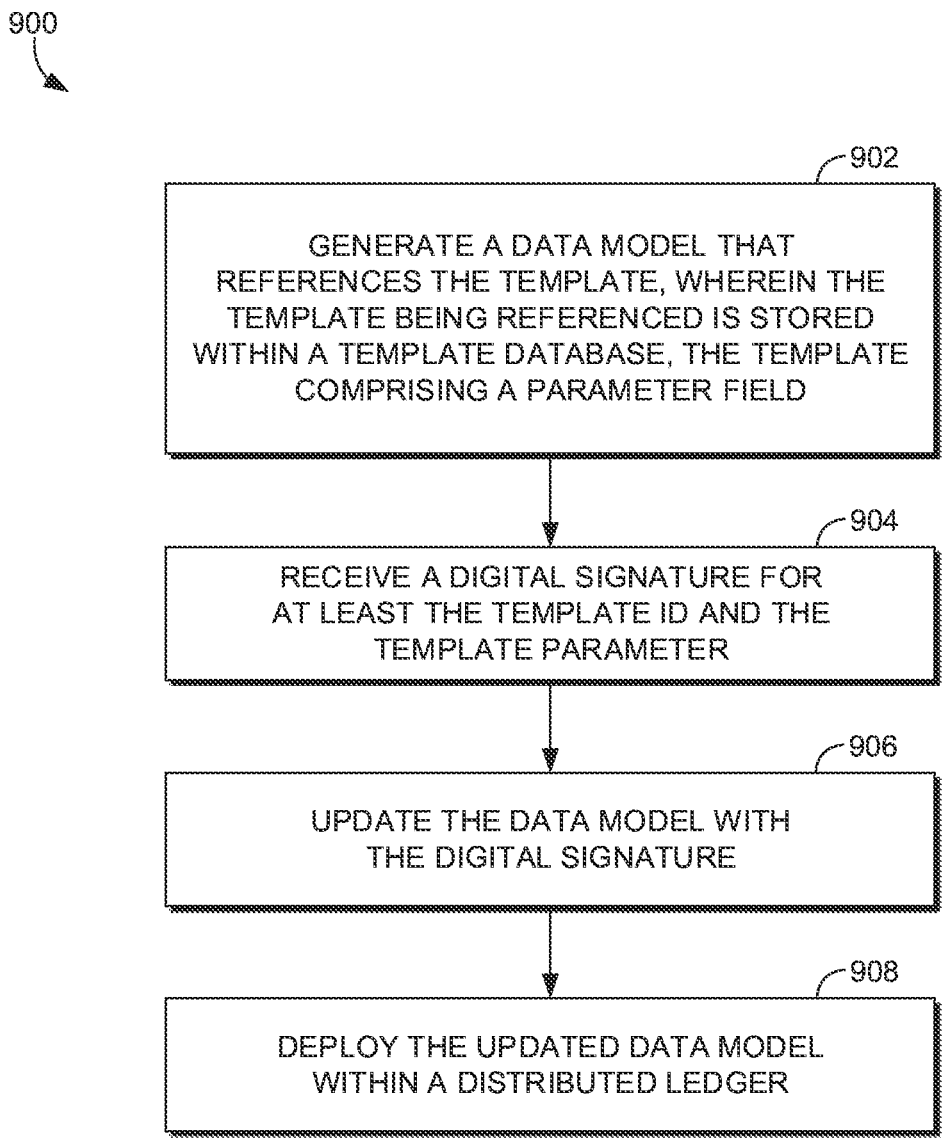
Figure 10:
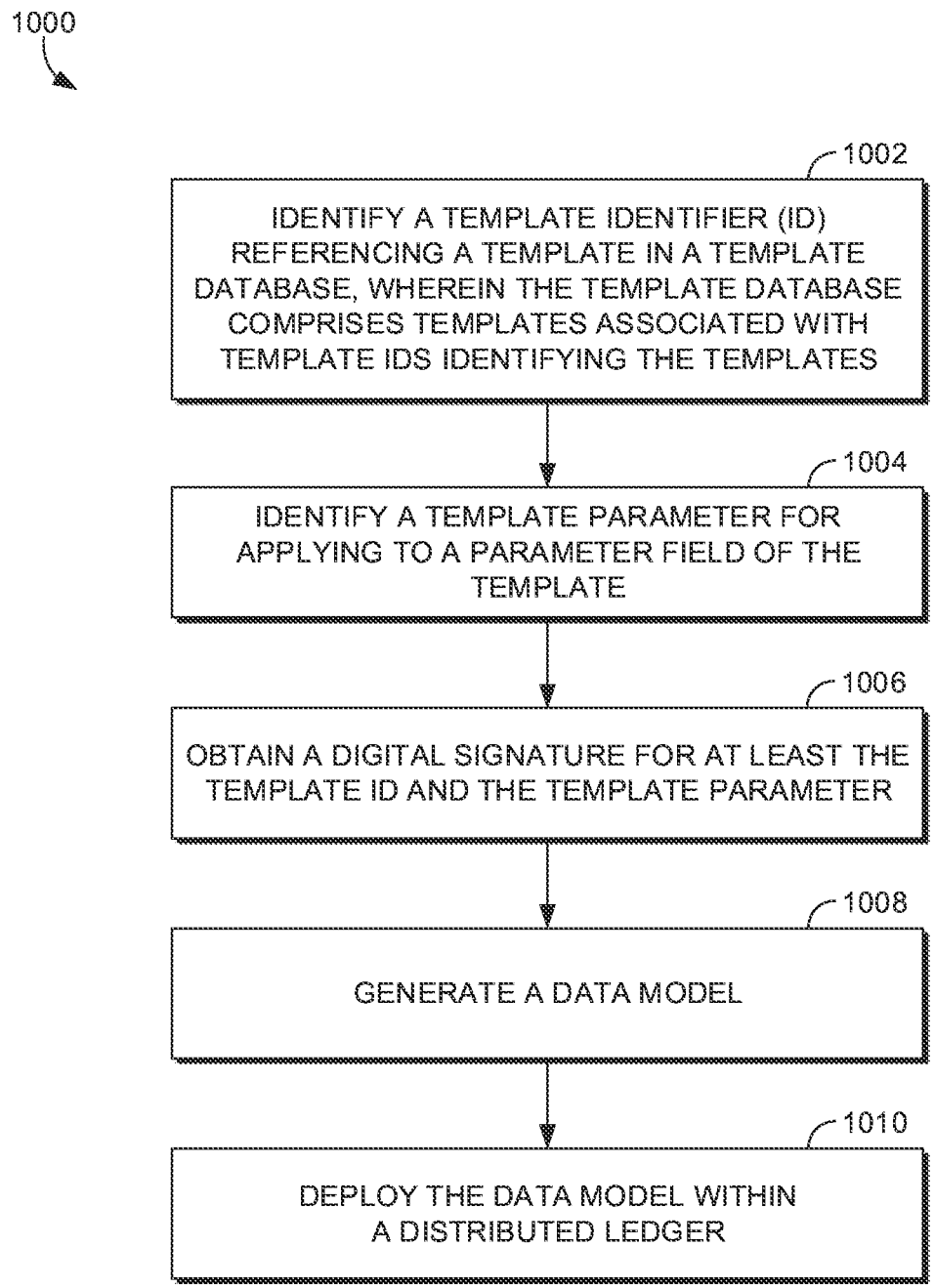

Turning now to FIGS. 8-10, block diagrams are provided to illustrate methods for generating and deploying data models within a distributed ledger. The methods may be performed using the systems described herein. In embodiments, one or more computer storage media having computer-executable instructions embodied thereon that, when executed, by one or more processors, cause the one or more processors to perform operations of the methods.

Referring to FIG. 8, a block diagram is provided illustrating method 800 for generating and deploying a data model representing an agreement to a distributed ledger. At block 802, a template database is populated. The template database may be populated using template population component 202 of signing engine 200. The templates populated within the template database are associated with a unique template ID, identifying each template from a plurality of templates within the template database. As described, the templates may be formed in whole or in part by clauses. The templates may comprise, among other elements, fixed elements and parameter fields, to which input template parameters may be associated.

The template database may be any form of datastore. In a particular aspect, the template database a distributed ledger. In storing templates in this manner, the templates are stored in an immutable format within the template database.

At block 804, a data model is generated. The data model may reference stored items, such as templates, clauses, attachments, and so forth. This may be done using IDs in the data model. For instance, the data model generated at block 804 may reference a template by comprising a template within the data model when generated. The template ID references a template in the template database, and the referenced template comprises a parameter field. The data model generated at block 804 further comprises a template parameter. The template parameter is associated with the parameter field, e.g., the template parameter is for applying to the parameter field when constructing the agreement from the data model. In a specific implementation, the data model is generated to be in a JSON file format.

In some aspect, the data model is signed. That is, the data model representing the agreement may be used to generate a digital signature. The digital signature generated using the data model is added as a data object within the data model. In this example, the data model comprising the template ID and the parameter field, among any other elements, is digitally signed when the digital signature is generated. In another example, the data model, when signed, comprises the template ID, the template parameter, and an attachment ID that identifies an encrypted attachment that is included as part of the generated agreement, which may be stored in a DSN. Signing of the data model may be performed using digital signature service 206 of signing engine 200. In implementations having multiple signatures, signature aggregator 208 may also be used to generate an aggregated signature for inclusion in the data model to represent the signed agreement.

At block 806, the data model is deployed within a distributed ledger. This can be performed using data model deployment component 210 of signing engine 200. In an aspect, the data model deployed comprises the digital signature, which may include an aggregated signature. In implementations, deployment may include communicating the data model to one or more nodes of the distributed ledger network Turning now to FIG. 9, another block diagram illustrating example method 900 for generating and deploying a data model is provided. At block 902, a data model is generated. The data model may represent an agreement and include a reference, in the form of a template ID, to a template immutably stored in a template database. The template may be formed, in whole or in part, by one or more clauses. In one particular example, the template database is part of a distributed ledger network. As an example, the data model may be in a JSON file format.

The template identified by the template ID may comprise a parameter field with which a template parameter may be associated. In generating the data model at block 902, the data model may further comprise a template parameter associated with the parameter field. For instance, the template parameter may be applied to the parameter field when reconstructing the agreement from the data model. The data model may further be generated to comprise other data objects that represent elements of an agreement, such as IDs identifying immutably stored or encrypted attachments, video, images, audio, and the like. These agreement elements, such as an attachment associated with an attachment ID, may be encrypted and stored in a DSN. Template IDs and any other IDs may be character string. In cases, the character strings comprises a predetermined number of characters, such as a 46-character string. In some implantations, character strings are cryptographically secure strings. In one application, a hashing algorithm may be used to generate a hash value as the IDs. The data model may be communicated for execution.

At block 904, a digital signature is received for the data model. That is, the digital signature may be received for the data model comprising at least the template ID and the template parameter, and any other data objects. The digital signature may indicate a signature, comprise a plurality of digital signatures from a plurality of signors, or be an aggregated digital signature. The digital signature may have been generated by a digital signature algorithm using, for instance digital signature service 206 or signature aggregator 208 of signing engine 200 in FIG. 2.

At block 906, the data model is updated with the digital signature. As noted, the signed data model at block 904 generates a digital signature. The digital signature generated can be added to the data model having been digitally signed. In doing so, the data model represents the agreement and the digital signature indicates that the agreement has been executed. In implementations, data model generator 204 can be used to update the data model with the digital signature.

At block 908, the updated data model is deployed within a distributed ledger. This can be performed using data model deployment component 210 of signing engine 200. By deploying the data model within the distributed ledger, the data model is recorded within the distributed ledger. In implementations, deployment may include communicating the data model to one or more nodes of the distributed ledger. The data model may also be stored at a DSN, and can be retrieved from the DSN and used to represent or reconstruct the agreement.

With reference now to FIG. 10, another block diagram illustrating example method 1000 for generating and deploying a data model is provided. At block 1002, a template ID is identified. The template ID may uniquely identify a template stored in a template database. For instance, the template identified by the template ID may be immutably stored in a distributed ledger, and the template database may generally comprise templates associated with template IDs. In an aspect, a template is selected at a client device, and from it, the associated template ID is identified. In another aspect, the template is generated at a client device, and the template ID is assigned in association with the template when stored in the template database. In some cases, templates may be formed, in part or in whole, by one or more clauses having been selected at a computing device, such as the client device.

At block 1004, a template parameter is identified. The identified template parameter is associated with the parameter field of the template. That is, the template parameter may be applied to the parameter field in forming or constructing the agreement. The template parameter may be identified from an input provided at a computing device, such as the client computing device. Other IDs or elements may be identified in a similar manner, such as clause IDs, attachment IDs, and so forth.

At block 1006, a digital signature is obtained. This may be done using digital signature service 206 or signature aggregator 208 of signing engine 200. In a particular example, the digital signature is generated from the template ID and the template parameter, or any other identified data objects. The data objects, such as the template ID and template parameter, may be in a data model format, such as a JSON file format. Obtaining a digital signature may comprise receiving a digital signature.

At block 1008, a data model is generated with the digital signature. For instance, the data model may be in a specific file format. One such example is a JSON file format. The data model may be generated by forming the data objects, such as the identified template ID, template parameter, and obtained digital signature, in the file format of the data model. In implementations, the template ID and the template parameter are in a data model format when signed. As such, when generating the data model, the digital signature obtained for at least the template ID and the template parameter in the data model format is added back to the data model, thus indicating an executed agreement represented by the data model and guaranteeing the integrity of the signed agreement.

At block 1010, the generated data model is deployed within a distributed ledger. This can be performed using data model deployment component 210 of signing engine 200. By deploying the data model within the distributed ledger, the data model is recorded within the distributed ledger. In implementations, deployment may include communicating the data model to one or more nodes of the distributed ledger.

Having described an overview of embodiments of the present technology, an example operating environment in which embodiments of the present technology may be implemented is described below in order to provide a general context for various aspects.

Figure 11:
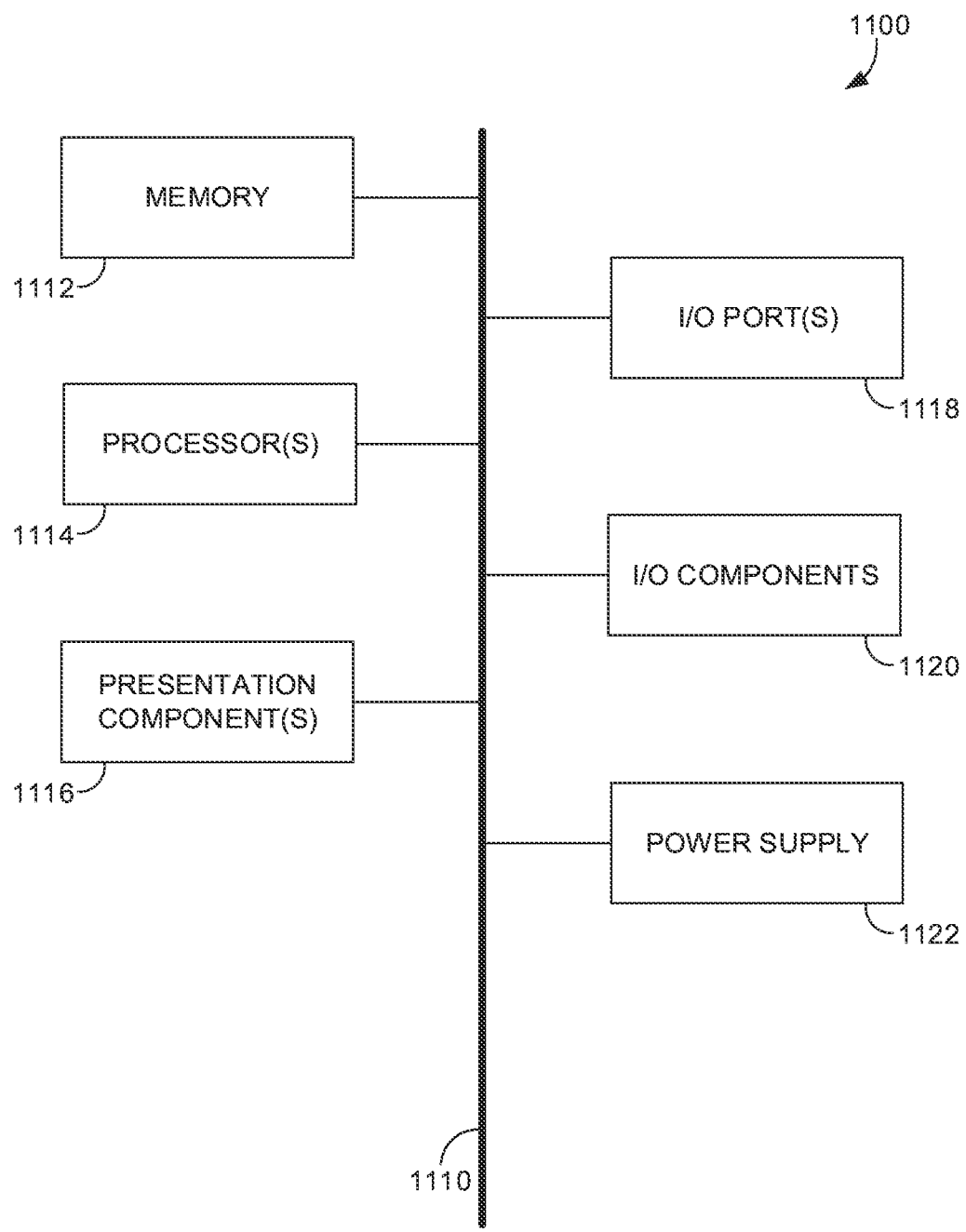
FIG. 11 illustrates an example computing device suitable for implementing aspects of the technology, in accordance with an aspect described herein.

Referring now to FIG. 11, in particular, an example operating environment for implementing embodiments of the present technology is shown and designated generally as computing device 1100. Computing device 1100 is but one example of a suitable computing environment and is not intended to suggest any limitation as to the scope of use or functionality of the technology. Computing device 1100 should not be interpreted as having any dependency or requirement relating to any one or combination of components illustrated. Computing device 1100 is intended to represent one or more computing devices, including those operating within a cloud-based platform.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With continued reference to FIG. 11, computing device 1100 includes bus 1110 that directly or indirectly couples the following devices: memory 1112, one or more processors 1114, one or more presentation components 1116, input/output ports 1118, input/output components 1120, and illustrative power supply 1122. Bus 1110 represents what may be one or more busses (such as an address bus, data bus, or combination thereof).

Although the various blocks of FIG. 11 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 11 is merely an example computing device that can be used in connection with one or more embodiments of the present technology. Distinction is not made between such categories as "workstation," "server," "laptop," "handheld device," etc., as all are contemplated within the scope of FIG. 11 in reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1112 includes computer storage media in the form of volatile or nonvolatile memory. The memory may be removable, non-removable, or a combination thereof. Example hardware devices include solid-state memory, hard drives, optical-disc drives, etc. Computing device 1100 includes one or more processors 1114 that read data from various entities such as memory 1112 or I/O components 1120. Presentation component(s) 1116 present data indications to a user or other device. Examples of presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, and so forth. Power supply 1122 may include any power source, or be illustrative of a terminal to a power source, suitable for powering one or more components of FIG. 11.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies.

Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having," or derivatives thereof, has the same broad meaning as the word "comprising," and the word "accessing," or derivatives thereof, comprises "receiving," "referencing," or "retrieving." Further, the word "communicating," or derivatives thereof, has the same broad meaning as the word "receiving" or "transmitting" facilitated by software or hardware-based buses, receivers, or transmitters using communication media. Also, the word "initiating," or derivatives thereof, has the same broad meaning as the word "executing" or "instructing," where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the described schematics, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A method comprising:
    populating a template database with templates associated with template identifiers (IDs) identifying the templates;
    generating a data model that references a template within the template database, the data model comprising:
      a template ID referencing the template in the template database,
    wherein the template comprises a parameter field;
      a template parameter to apply to the parameter field; and a digital signature for at least the template ID and the template parameter; and deploying the data model within a distributed ledger.

2. The method of claim 1, wherein the template database comprises a second distributed ledger.

3. The method of claim 1, wherein the templates are stored in an immutable format within the template database.

4. The method of claim 1, wherein the data model is generated in a JSON (JavaScript Object Notation) file format.

5. The method of claim 1, wherein the data model further comprises an attachment ID, the attachment ID referencing an encrypted document stored in a distributed storage network (DSN).

6. A system comprising:
a memory component; and
a processing device coupled to the memory component, the processing device to perform operations comprising:
generating a data model that references the template, wherein the template being referenced is stored within a template database, the template comprising a parameter field that is editable, the data model comprising:
a template identifier (ID) that identifies the template within the template database; and
a template parameter for applying to the parameter field;
receiving a digital signature for at least the template ID and the template parameter;
updating the data model with the digital signature; and
deploying the updated data model within a distributed ledger.

7. The system of claim 6, wherein the template database comprises a second distributed ledger.

8. The system of claim 6, wherein the templates are stored in an immutable format within the template database.

9. The system of claim 6, wherein the data model is generated in a JSON (JavaScript Object Notation) file format.

10. The system of claim 6, wherein the data model further comprises an attachment ID, the attachment ID referencing an encrypted document stored in a distributed storage network (DSN).

11. The system of claim 6, wherein the digital signature comprises an aggregated signature that is representative of a plurality of signatures.

12. The system of claim 6, wherein the template ID comprises a cryptographically secure string.

13. One or more non-transitory computer-readable medium storing executable instructions, which when executed by a processing device, cause the processing device to perform operations comprising:
identifying a template identifier (ID) referencing a template in a template database, wherein the template database comprises templates associated with template IDs identifying the templates;
identifying a template parameter for applying to a parameter field of the template;
obtaining a digital signature for at least the template ID and the template parameter;
generating a data model comprising:
the template ID;
the template parameter for applying to the parameter field; and
the digital signature; and
deploying the data model within a distributed ledger.

14. The medium of claim 13, wherein the template database comprises a second distributed ledger.

15. The medium of claim 13, wherein the templates are stored in an immutable format within the template database.

16. The medium of claim 13, wherein the data model is generated in a JSON (JavaScript Object Notation) file format.

17. The medium of claim 13, wherein the data model further comprises an attachment ID, the attachment ID referencing an encrypted document stored in a distributed storage network (DSN).

18. The medium of claim 13, wherein the digital signature comprises an aggregated signature that is representative of a plurality of signatures.

19. The medium of claim 13, wherein the template ID comprises a cryptographically secure string.

* * * * *